June 21, 1966

F. R. FINE 3,256,778

AUTOMATIC LEVER CONTROL APPARATUS FOR
AUTOMATING PRESS OPERATIONS

Filed May 6, 1964

INVENTOR.
FREDERICK R. FINE
BY
*Elliott & Pastoriza*
ATTORNEYS

United States Patent Office 3,256,778
Patented June 21, 1966

3,256,778
AUTOMATIC LEVER CONTROL APPARATUS FOR AUTOMATING PRESS OPERATIONS
Frederick R. Fine, 2423 E. 57th St., Los Angeles, Calif.
Filed May 6, 1964, Ser. No. 365,270
6 Claims. (Cl. 91—35)

This invention relates generally to control apparatus and more particularly to a novel apparatus for a press operating lever for moving the lever between successive positions in accordance with a pre-arranged program all in a fully automatic manner.

In certain molding operations, a press is closed on material within the mold and a low pressure is built up. Thereafter the press is opened and closed a succession of times, this process being known as "bumping" the mold. Next, the press is closed and a high pressure applied thereto for a given period. Thereafter, the mold is again "bumped" by opening and closing the press sequentially a number of times. Finally, the high pressure is applied to close the press and hold it closed during a curing cycle. The press may then be opened and the molded article removed.

Heretofore, a single press operating lever has been provided which may be moved between first, second and third positions. In the first position, the press is open and pressure is cut off from the press. In the second position, the desired low pressure is applied to close the press, and in the third position, the necessary high pressure is applied. Normally, a press operator is required to move the press operating lever to the successive positions and in such a manner that the mold is "bumped" the required number of times in both the low pressure and high pressure conditions. The operation requires careful attention on the part of the operator and usually one or two presses at the most can only be handled by a single person.

In the event the operator is late in applying certain pressures or releasing the press, there results a non-uniformity in the finished molded product as compared to previous products made in the mold. Thus, under manually operable conditions, it is very difficult to insure a uniform product. Moreover, should the operator inadvertently omit certain steps in the press lever sequence, the entire molded product may be ruined with the consequence that the operator must start over again.

To overcome the foregoing problems, very elaborate presses have been designed which are automatically controlled. However, the mechanism is complicated and expensive and for many smaller molding companies, wherein the conventional type lever has been provided, it is unfeasible to convert to the presently available automatic systems.

With the foregoing in mind, it is accordingly a primary object of this invention to provide a relatively inexpensive press lever control apparatus which will automatically move the normally present manual operating lever between its successive positions in accordance with the desired program to the end that present equipment need not be replaced but merely added to with considerably less expense than would be the case wherein an entirely new automated system is installed.

More particularly, it is an object to provide an automatic means for controlling the manual lever provided for operating a press in accordance with a predetermined program so that consistently high quality molded articles are produced.

Another object is to provide an automatic lever control apparatus for automating press operations in which the entire cycle of low and high pressure applications and "bumping" is carried out completely automatically so that a single operator may supervise the operation of several presses at the same time and wherein human error is substantially eliminated.

Briefly, these and many other objects and advantages of this invention are attained by providing a simple frame structure adapted to be secured directly adjacent to the normally present manual press operating lever. An actuating means is supported by this frame structure and coupled to the lever in such a manner that actuation of the actuating means will move the lever between successive positions.

A control means in turn is connected to the actuating means and incorporates a programming circuit such as to actuate the actuating means to cause the lever to move in accordance with a desired sequence. The entire arrangement is such that the apparatus may be attached to the lever without any modification of the normal lever equipment. Moreover, if it is desired to revert back to manual operation, it is a simple matter to remove the actuating apparatus.

A better understanding of the invention will be had by now referring to a preferred embodiment thereof as illustrated in the accompanying drawings, in which.

Figure 1:
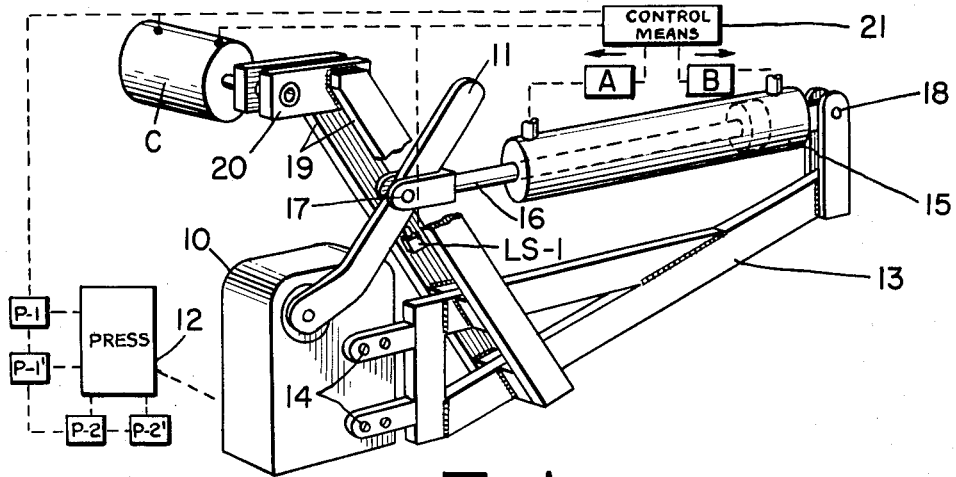
FIGURE 1 is a schematic perspective view partly broken away illustrating the basic components making up the automatic lever control apparatus wherein the lever is in a first or starting position.
Figure 2:
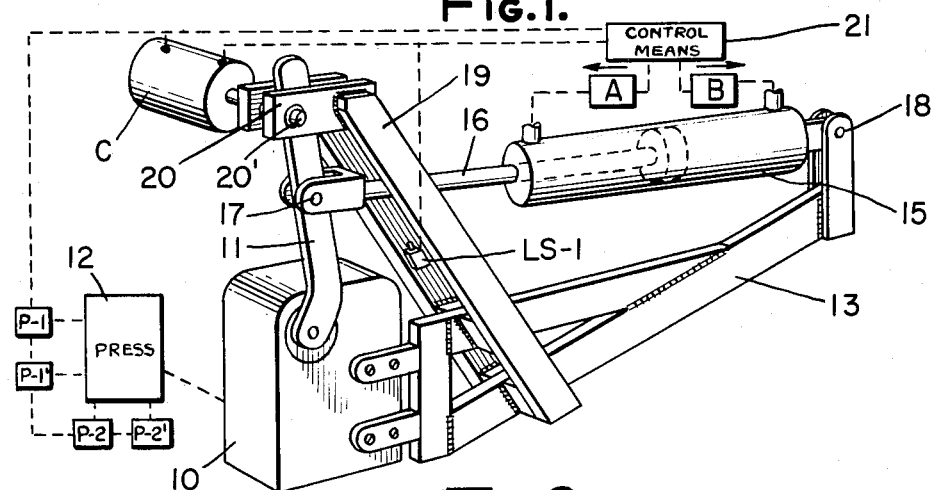
FIGURE 2 is a view similar to FIGURE 1 showing a second intermediate position of the lever.
Figure 3:
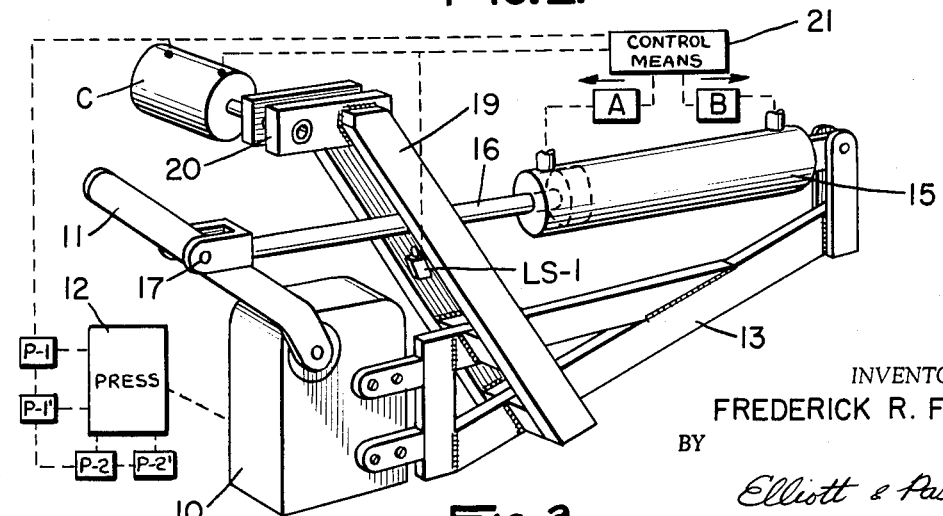
FIGURE 3 is another view similar to FIGURES 1 and 2 but illustrating the lever in a third actuated position; and, FIGURE 4 is a highly schematic electrical circuit diagram of a portion of the control apparatus for automatically operating the structure illustrated in FIGURES 1, 2, and 3.

Referring to FIGURES 1, 2, and 3, there is illustrated schematically a conventional switch housing 10 having a lever 11 for operating a press 12. In conventional operation, the lever 11 may be manually moved from the position illustrated in FIGURE 1 to an intermediate straight up and down position as shown in FIGURE 2 which movement serves to close the press 12 and apply low pressure thereto. The lever 11 may also be moved to a third position illustrated in FIGURE 3 wherein the press is closed and high pressure is applied thereto. In the position illustrated in FIGURE 1, the press is open and pressure is cut off.

As described heretofore, in certain molding operations it is desirable to first apply a low pressure and "bump" the mold at this low pressure perhaps five or six times. A high pressure is then applied and the mold "bumped" at this high pressure. The high pressure is then maintained while the material in the mold is cured.

The foregoing operations when carried out manually, require that an operator move the lever 11 from the position illustrated in FIGURE 1 to the position illustrated in FIGURE 2 and hold the lever in this position until a given pressure has built up. This pressure is normally viewed on a pressure gauge. After this pressure has built up, the operator then moves the lever from the position illustrated in FIGURE 2 back to the position illustrated in FIGURE 1 and then back and forth between the first and second positions to "bump" the mold. The operator then moves the lever 11 to the third position illustrated in FIGURE 3 to apply high pressure. When a given high pressure is reached as observed on a pressure gauge, the operator then similarly "bumps" the mold and then maintains the mold closed in the high pressure position until the product cures.

The apparatus for carrying out the foregoing operations automatically is also illustrated in FIGURES 1, 2, and 3, and as shown, includes a basic frame structure 13 adapted to be secured to the lever casing 10 as by bolts 14 in a position adjacent to the lever 11. A suitable actuating means in the form of a cylinder 15 and piston 16 is carried by the frame 13. As shown, the free end of the piston 16 is pivoted to the lever 11 as at 17 and the opposite end of the cylinder is pivoted to the frame structure 13 as at 18. By this arrangement, extension or retraction of the piston rod 16 from the cylinder 15 will move the lever 11 between its various first, second, and third positions, the cylinder 15 being free to swing about the mounting pivot 18 to accommodate this movement.

A control means includes a stop structure 20 shown in the upper portion of the drawing secured to the frame structure 13. This stop structure has a stop pin 20' adapted to be extended so as to physically check movement of the lever 11 to an upright position such as illustrated in FIGURE 2. The control means also includes a control circuit 21 connected to suitable electrically operated valves such as indicated at A and B for moving the piston 16 within the cylinder 15. This control circuit is also connected to a solenoid C which when energized will cause the stop pin 20' to project into an interfering position.

The overall control apparatus further includes a microswitch LS–1 positioned on the frame structure 13 and arranged to be closed when the lever arm 11 is in the position illustrated in FIGURE 1. Also provided are low and high pressure responsive switches P–1, P–1' and P–2, P–2'. These pressure switches are responsive to given low and high pressures respectively in the press 12 to function in an alternate closed and open position as will be described more completely when the operation of the structure is set forth. The control circuit 21 is programmed so that when a molding operation is to take place, the lever 11 is moved in the sequence as described heretofore for manual operation.

Figure 4:
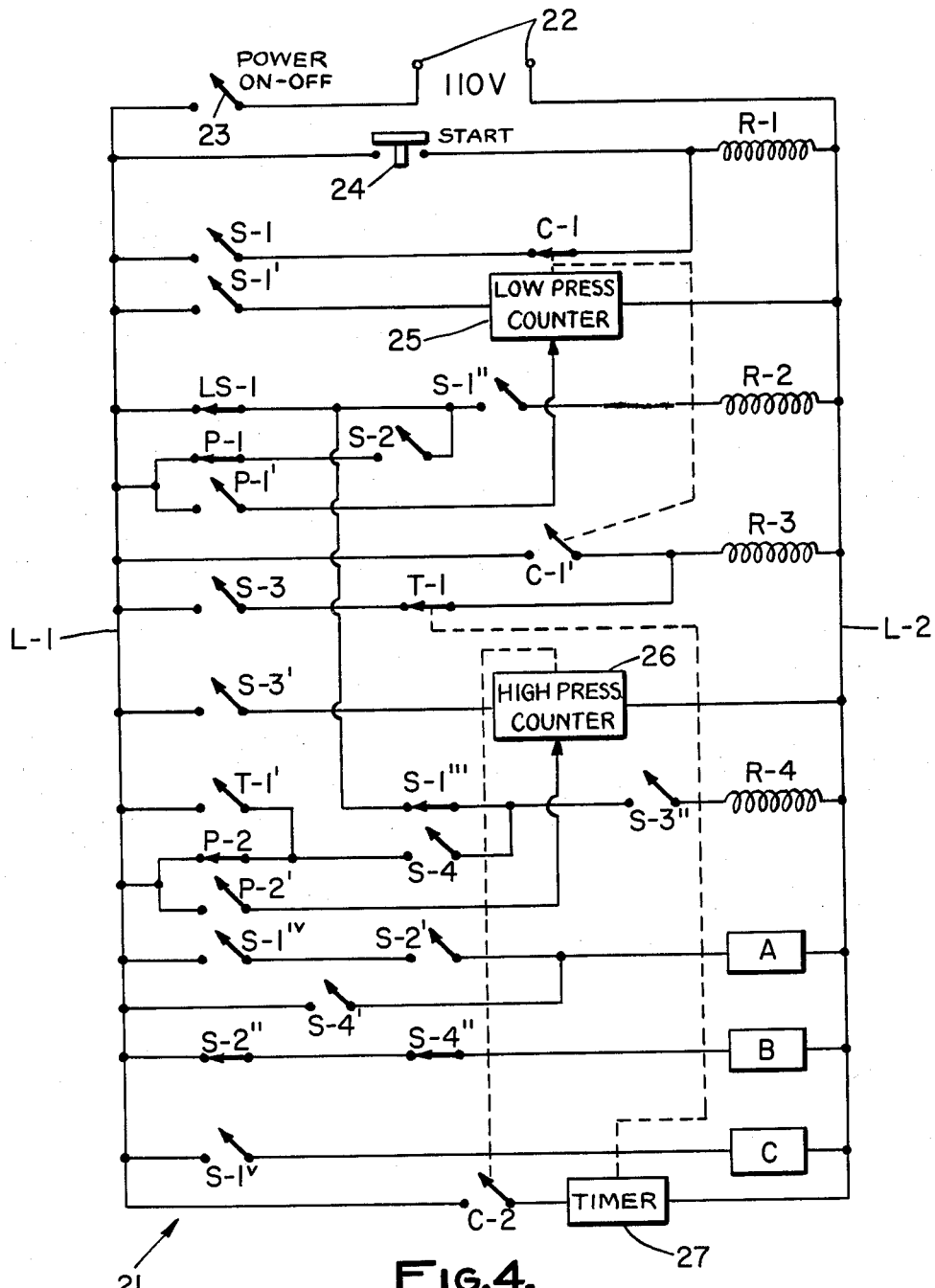

One type of control circuit for effecting these operations is schematically illustrated in FIGURE 4. In FIGURE 4, the electrical control valves A and B and the stop operating solenoid C are designated by the same letters. Also, the microswitch LS–1 corresponds to the correspondingly indicated switch in FIGURES 1, 2 and 3, and the pressure switches P–1, P–1' and P–2, P–2', are designated by the same symbols.

The control circuit includes power input terminals 22 as shown at the top of the drawing to provide 110 volt electrical energy between power lines L–1 and L–2 extending down the left and right hand sides of the page. An on-off power switch 23 is incorporated in the line L–1 as shown. Connected across the power lines L–1 and L–2 is a start button 24 and a first relay coil R–1. The relay coil R–1 when energized is arranged to operate the various switches indicated S–1, S–1', S–1", S–1$^{IV}$ and S–1$^V$ which are all normally open. Also energization of the relay coil R–1 will open switch S–1''' which is normally closed and is shown in the lower center portion of the drawing. In series with the switch S–1 is a low pressure counter switch C–1 which is normally closed. A low pressure counter for operating the switch C–1 is connected across the line by the switch S–1' as shown at 25.

Following down the connections between the power lines L–1 and L–2, the limit switch LS–1 which is closed when the lever arm 11 is in the first position illustrated in FIGURE 1 since this lever arm engages the switch, connects in series with the switch S–1" to a second relay coil R–2. When the relay coil R–2 is energized, it will close switches S–2 and S–2', shown in the lower center portion of the drawing. Also, there will simultaneously be opened the normally closed switch S–2" when the relay coil R–2 is energized.

The low pressure switch P–1 is normally closed and connects from the power line L–1 through the normally open switch S–2 and the normally open switch S–1" as shown. The low pressure switch P–1' is normally open and connects from the power line L–1 to the low pressure counter 25. When a given low pressure is reached such as 300 p.s.i. the switch P–1 will open and the switch P–1' will close. When the pressure drops below 300 p.s.i., the switch P–1 will close and the switch P–1' will open.

Immediately below and to the right of the low pressure switches is a second low pressure counter switch C–1' which is normally open. C–1' will close when C–1 opens at the end of a given pressure count registered by the low pressure counter 25. The switch C–1' is in series with a third relay coil R–3. Energization of the relay coil R–3 serves to close switches S–3, S–3' and S–3". The switch S–3 is in series with a normally closed timer switch T–1, the other end of which connects to the relay coil R–3 as shown.

The switch S–3' serves to connect a high pressure counter 26 across the lines L–1 and L–2 when it closes. The high pressure counter 26 is arranged to close a normally open switch C–2 shown at the bottom of the drawing after a given count has been registered. The switch C–2 is in series with a timer 27 shown at the bottom of the drawing. This timer functions to close a normally open timer switch T–1' shown at the central left portion of the drawing, at the beginning of a timing period and then open the switch T–1' and momentarily open the timer switch T–1 at the end of the timing period.

Referring again to the upper portion of the drawing, the line is tapped from the microswitch LS–1 and extends down the drawing through the normally closed switch S–1''' and thence to the normally open switch S–3" to a fourth relay coil R–4, the other side of which connects to the line L–2. When relay coil R–4 is energized, switch S–4 and S–4' are closed and switch S–4" is opened. A high pressure responsive switch P–2 connects in series with a switch S–4 from the line L–1 up to the switch S–3" as shown. A second part of this high pressure switch shown at P–2' is normally open and connects from the line L–1 to the high pressure counter 26. The switch P–2 is caused to open in response to a given high pressure and simultaneously the switch P–2' to close. When the pressure drops below this given high pressure, the switch P–2 will close and the switch P–2' will open.

The solenoid operated valve A for the cylinder 15 of FIGURES 1–3 is connected in series with the switch S–1$^{IV}$ and the switch S–2'. These latter two switches are in parallel with the switch S–4'.

The solenoid operated valve B for the cylinder is in series with the switches S–2" and S–4" which are normally closed as indicated.

Finally, the stop solenoid C is connected in series with the switch S–1$^V$ across the lines L–1 and L–2.

With the brief description of the various components making up the circuit of FIGURE 4 as set forth above in mind, the operation of the entire system will now be described.

Initially, mold material will be placed in the press 12 of FIGURE 1. With the lever arm 11 in the first position shown wherein it engages the microswitch LS–1, and wherein the press is open and no pressure is applied thereto, the various switches illustrated in FIGURE 4 will be in the positions shown. The operator may now turn on the on-off switch 23 to close the circuit to the lines L–1 and L–2. When the operator now presses the start button 24, relay coil R–1 will be immediately energized. As a consequence, switches S–1, S–1', S–1", S–1$^{IV}$ and S–1$^V$ will all close simultaneously and S–1''' will open. Closing of the switch S–1 locks in the relay R–1 through C–1, closing of the switch S–1' will energize the low pressure counter 25 by connecting the same across the lines L–1 and L–2, and closing of the switch S–1" will energize, through the normally closed switch LS–1, the relay coil R–2.

In the event that the lever arm 11 is not engaging the microswitch LS–1 so that the microswitch LS–1 is open, the relay coil R–2 will not be energized. However, with the relay coil R–2 not energized, the normally closed switch S–2" shown in the lower left hand portion of the drawing will remain closed so that the solenoid actuated valve B will be immediately energized to pull the lever arm 11 back against the microswitch LS–1, thereby closing the microswitch to energize the relay coil R–2. When the relay coil R–2 energizes, it will open the switch S–2" thereby de-energizing the solenoid actuated valve B.

When the relay coil R–2 is energized, the switch S–2' will be closed and since the switch S–1$^{IV}$ is closed because of energization of the relay coil R–1, solenoid valve A will be actuated to cause the piston 16 in FIGURE 1 to start moving the lever arm 11 from the first position towards the second position shown in FIGURE 2. At the same time closing of the switch S–1$^{V}$ in the lower portion of the drawing energizes the solenoid C to cause the stop pin 20' to pass through the frame structure 20 so that the lever arm 11 will physically strike this pin and be checked in the position illustrated in FIGURE 2. In this position, low pressure is applied to the press 12 and the press will close on the mold. The pressure will build up to a value of approximately 300 p.s.i., by way of example. At this pressure, the pressure switch P–1 in FIGURE 4 will open and simultaneously the pressure switch P–1' will close. Opening of the pressure switch P–1 will de-energize the relay coil R–2, since the microswitch LS–1 is now open after the lever arm 11 has left the microswitch. Closing of the pressure switch P–1' will apply a pulse to the low pressure counter 25.

When the relay coil R–2 is de-energized, the switch S–2" shown in the lower left hand portion of FIGURE 4 will close to its normally closed position and thereby energize the solenoid actuated valve B to return the lever arm 11 back to its position illustrated in FIGURE 1.

When the lever 11 reaches this position, it engages the microswitch LS–1 to close the same so that the relay coil R–2 is again energized. Energization of the relay coil R–2 will then close the switch S–2' to again energize the solenoid actuated valve A and return the lever arm 11 to the stop position illustrated in FIGURE 2. The low pressure applied to the press will then again build up and the cycle will be repeated, the closing and opening of the pressure switch P–1' applying a count to the low pressure counter 25 for each cycle. If the low pressure counter 25 is set to actuate the switches C–1 and C–1' upon completion of a given count such as six, then C–1 will open and C–1' will close at the end of the count to de-energize relay coil R–1 and energize relay coil R–3. The switches C–1 and C–1' are momentary in operation so that they return to their positions shown. With the solenoid R–3 energized through S–3 and T–1, switches S–3, S–3' and S–3" will be closed. Closing of the switch S–3" will energize the relay coil R–4 to close the switches S–4 and S–4'. The switch S–4" on the other hand will be opened. The switch S–1$^{V}$ will also be open since the relay coil R–1 is now de-energized through opening of S–1 upon the momentary opening of C–1 so that the stop pin 20' will be retracted by the solenoid C.

When the switch S–4' closes, the solenoid A will be energized to now move the lever arm 11 all the way over to the third position illustrated in FIGURE 3 to apply high pressure to the press. When a given high pressure such as 3000 pounds per square inch is reached, the pressure switch P–2 will open and the other pressure switch P–2' will close. Opening of the pressure switch P–2 de-energizes the relay coil R–4 so that the switch S–4' opens to de-energize solenoid valve A and the switch S–4" closes to its normally closed position to energize the solenoid B and return the lever 11 to its first position.

Also, the pressure switch P–2' will close applying a count to the high pressure counter 26.

When the lever 11 returns to its first position illustrated in FIGURE 1 it will close the microswitch LS–1 which will apply power from the line L–1 down through the normally closed switch S–1'" and the now closed switch S–3" to again energize the relay coil R–4. The switch S–4' will then be closed to again energize the solenoid valve A and the solenoid valve B will be de-energized through opening of the switch S–4". The lever arm 11 will then be returned to the third position illustrated in FIGURE 3 until the pressure again builds up to a high value at which time operation of the pressure switches will repeat this cycle. Each time the pressure switches alternate as before, a count will be registered in the high pressure counter 26 until a complete count is achieved at which time the switch C–2 will be closed to energize the timer 27. Energization of the timer 27 closes the switch T–1' to maintain the relay coil R–4 energized.

After a given time interval has been completed, the switch T–1 is momentarily opened so that the relay coil R–3 is de-energized to open S–3" and de-energize the coil R–4. T–1' is also opened at the end of the timing cycle. The lever arm 11 will then return to its first position illustrated in FIGURE 1 hitting the microswitch LS–1 to close the same. All of the switches are now in their original position, and the various relay coils are all de-energized. The molded product may now be removed and new mold material placed in the mold. The sequential cycle is then started again by pressing the start button 24.

From the foregoing description it will thus be evident that the present invention has provided a novel means for automatically controlling a manually operable press lever.

While only one particular control means for sequencing the operation of the lever has been described in detail, it will be evident to those skilled in the art that equivalent control means could be employed. The essential features of the invention reside in the provision of the frame structure and actuating means for sequencing the normal manually operable lever 11 through the positions as described in a completely automatic manner.

What is claimed is:

1. An automatic apparatus for a press operating lever having at least first and second positions wherein said press is open and pressure to said press is cut off when said lever is in said first position, and said press is closed and pressure is applied thereto when said lever is in said second position, said control apparatus including: a frame structure adapted to be secured in a position adjacent to said lever; actuating means supported by said frame structure and coupled to said lever to move said lever between said first and second positions upon actuation; and control means connected to said actuating means to actuate said actuating means and thereby automatically move said lever from said first to said second position, said control means including a stop structure movable through a portion of said frame member within which said lever is movable for physically limiting movement of said lever between said first and second positions.

2. An apparatus according to claim 1, in which said control means includes timing sequencing means to actuate said actuating means in accordance with a given program.

3. An apparatus according to claim 1, in which said operating lever has a third position, said actuating means including means for moving said lever between said first and third positions.

4. An automatic control apparatus for a press operating lever having first, second, and third positions wherein said press is open and pressure to said press is cut off when said lever is in said first position, said press is closed and low pressure is applied thereto when said lever is in said second position, and said press is closed and high pressure is applied thereto when said lever is in said third position, said control apparatus including: a frame structure adapted to be secured in a position adjacent to said lever; actuating means supported by said frame structure and coupled to said lever to move said lever to said first, second, and third positions; and control means connected to said actuating means to move said lever between said first and second positions and between said first and third positions in accordance with a predetermined program.

5. An automatic control apparatus for a press operating lever having first, second, and third successive positions wherein said press is open and pressure to said press is cut off when said lever is in said first position, said press is closed and low pressure is applied thereto when said lever is in said second position, and said press is closed and high pressure is applied thereto when said lever is in said third position, said control apparatus comprising, in combination: a frame structure adapted to be secured in a position adjacent to said lever; a cylinder pivoted to said frame and having a piston rod adapted to be coupled to said lever to move said lever to said first, second and third positions; and a control means connected to actuate said piston to move said lever from said first to said second position; hold said lever in said second position until a given low pressure has built up; then move said lever back and forth between said first and second positions a given number of times; then move said lever to said third position; hold said lever in said third position until a given high pressure has built up; then move said lever back and forth between said first and third positions for a given number of times; then hold said lever in said third position for a given length of time; and then return said lever to said first position.

6. An apparatus according to cliam 5, in which said control means includes stop means secured to said frame structure and positioned so that upon actuation said lever is physically limited to movement between said first and second positions.

References Cited by the Examiner
UNITED STATES PATENTS

| | | | |
|---|---|---|---|
| 1,816,886 | 8/1931 | Yarnall et al. | 91—35 X |
| 2,009,487 | 7/1935 | Ernst et al. | |
| 2,292,846 | 8/1942 | Pritchard | 91—393 X |
| 2,367,242 | 1/1945 | Stacy | 18—16 |
| 2,618,833 | 11/1952 | Adams | 18—16 X |

SAMUEL LEVINE, *Primary Examiner.*

A. S. ROSEN, *Assistant Examiner.*